(12) United States Patent
Lee et al.

(10) Patent No.: US 8,948,924 B2
(45) Date of Patent: Feb. 3, 2015

(54) APPARATUS AND METHOD FOR DECIDING TRAVEL CONDITION OF VEHICLE

(75) Inventors: Kwon Soo Lee, Ansan-Si (KR); Yong Kwan Park, Seongbuk-Gu (KR)

(73) Assignee: Thinkware Systems Corporation, Seoul (KR)

( * ) Notice: Subject to any disclaimer, the term of this patent is extended or adjusted under 35 U.S.C. 154(b) by 689 days.

(21) Appl. No.: 12/742,222

(22) PCT Filed: Jun. 28, 2008

(86) PCT No.: PCT/KR2008/003774
§ 371 (c)(1),
(2), (4) Date: May 10, 2010

(87) PCT Pub. No.: WO2009/061057
PCT Pub. Date: May 14, 2009

(65) Prior Publication Data
US 2010/0256857 A1    Oct. 7, 2010

(30) Foreign Application Priority Data
Nov. 9, 2007    (KR) .................. 10-2007-0114525

(51) Int. Cl.
| G05D 1/00 | (2006.01) |
| G01C 21/28 | (2006.01) |
| B60T 8/172 | (2006.01) |
| B60W 40/076 | (2012.01) |

(52) U.S. Cl.
CPC ............... *G01C 21/28* (2013.01); *B60T 8/172* (2013.01); *B60W 40/076* (2013.01); *B60T 2201/04* (2013.01); *B60W 2420/905* (2013.01); *B60W 2520/105* (2013.01)
USPC .......................................... 701/1

(58) Field of Classification Search
USPC ................ 701/29.1, 400, 468, 500; 702/140; 73/1.75
See application file for complete search history.

(56) References Cited

U.S. PATENT DOCUMENTS

| 5,446,658 A | 8/1995 | Pastor et al. |
| 5,813,942 A * | 9/1998 | Nakagawa et al. ........... 477/120 |
| 5,828,585 A * | 10/1998 | Welk et al. ...................... 702/96 |
| 6,349,255 B1 | 2/2002 | Heckmann et al. |
| 6,847,887 B1 * | 1/2005 | Casino .......................... 701/461 |

(Continued)

FOREIGN PATENT DOCUMENTS

| EP | 1760475 A2 | 3/2007 |
| JP | 03-165265 | 7/1991 |

(Continued)

OTHER PUBLICATIONS

International Search Report mailed Dec. 19, 2008, for International Application No. PCT/KR2008/003774.

(Continued)

*Primary Examiner* — Sind Phongsvirajati
*Assistant Examiner* — Jonathan K Ng
(74) *Attorney, Agent, or Firm* — Saliwanchik, Lloyd & Eisenschenk

(57) ABSTRACT

An apparatus and method of determining a driving state of a moving object using a gravity value sensor and a speed measurement device is provided. Specifically, disclosed is an apparatus and method that can determine whether a moving object is in a level driving state or in an inclining/declining-slope driving state using a Y-axis measurement value of an acceleration sensor and a speed of a speed measurement unit.

8 Claims, 5 Drawing Sheets

(56) References Cited

U.S. PATENT DOCUMENTS

| | | | |
|---|---|---|---|
| 7,035,733 B1* | 4/2006 | Alwar et al. | 701/409 |
| 7,194,341 B2 | 3/2007 | Altenkirch | |
| 7,463,953 B1* | 12/2008 | Lee et al. | 701/1 |
| 2003/0112174 A1* | 6/2003 | Kim | 342/70 |
| 2004/0176897 A1* | 9/2004 | Williams | 701/70 |
| 2005/0085950 A1* | 4/2005 | Altenkirch | 701/1 |
| 2005/0125146 A1* | 6/2005 | Phuyal et al. | 701/208 |
| 2006/0080033 A1* | 4/2006 | Komatsu | 701/209 |
| 2007/0103279 A1* | 5/2007 | Hayashi et al. | 340/429 |
| 2007/0173984 A1* | 7/2007 | Nakayama | 701/1 |
| 2007/0276576 A1* | 11/2007 | Inoue et al. | 701/80 |
| 2008/0027645 A1* | 1/2008 | Okada et al. | 701/215 |
| 2010/0004893 A1* | 1/2010 | Katsumoto | 702/141 |

FOREIGN PATENT DOCUMENTS

| | | |
|---|---|---|
| JP | 2000-035331 | 2/2000 |
| JP | 2004-233306 | 8/2004 |
| JP | 2007-101527 | 4/2007 |

OTHER PUBLICATIONS

Supplementary European Search Report dated Apr. 23, 2012 in European Application No. 08778444.3, filed Jun. 28, 2008.

* cited by examiner

APPARATUS AND METHOD FOR DECIDING TRAVEL CONDITION OF VEHICLE

FIELD OF THE DISCLOSURE

The present disclosure relates to a navigation system, and more particularly, to a method and apparatus for determining whether a vehicle is inclined using an acceleration sensor and a speed of a moving object in order to determine whether the moving object is in a level driving state or in an inclining/declining-slope driving state, that is, whether the vehicle is inclined.

BACKGROUND OF THE DISCLOSURE

Generally, a navigation system is a system which provides information for driving of a transportation device, such as a vehicle, using an artificial satellite. The navigation system is also referred to as an automatic navigation system.

A typical navigation system is configured into one terminal and includes a storage medium to store map data. Also, the navigation system includes a Global Positioning System (GPS) receiver to receive GPS signals.

The navigation system calculates a location of a vehicle, and informs a user of a current location of the vehicle based on the calculated location of the vehicle. Also, the navigation system routes an optimal path from the current location to the user's desired destination and guides the user to the desired location, providing the user with various types of associated information along the path.

A method of calculating a location of a vehicle receives location data from a GPS satellite using a GPS receiver, and calculates the current location of the vehicle based on the received location data.

Another method of calculating a location of a vehicle calculates the current location of the vehicle using a gyro sensor and an acceleration sensor, which are installed in the vehicle. In this instance, the other method receives GPS signals, calculates the current location of the vehicle based on the received GPS signals, and corrects the calculated current location based on results detected by the gyro sensor and the acceleration sensor.

Also, a slope value of a sensor is determined using the acceleration sensor and an inclination of a vehicle is determined based on the determined slope value. For this, the acceleration sensor is vertically mounted in a front/side/bottom surface of a vehicle. The condition that an output value of the acceleration sensor is set as an initial value is required when a vehicle is in a horizontal state.

Specifically, in order to determine whether the vehicle is currently inclined using a three-axis acceleration sensor installed in the vehicle, or embedded in a PND-typed terminal installed in the vehicle, the inclination of the vehicle may be determined using a value of a Y axis near to a travel direction of the vehicle and a value of a Z axis vertical to the ground.

In this instance, when a front portion of the vehicle goes up, that is, when the vehicle is in the inclining-slope driving state, gravity acting on the Y axis may increase to thereby increase a measurement value. Conversely, when the front portion of the vehicle goes down, that is, when the vehicle is in the declining-slope driving state, the measurement value of the Y axis may be decreased. In both cases where the front portion of the vehicle goes up and where the front portion of the vehicle goes down, the Z axis may be decreased.

In the conventional art, when the vehicle is being driven, the value of the Y axis may be measured by adding the force by the gravity and the force by acceleration/deceleration. Therefore, an inclination level cannot be measured using only the measurement value.

If it is possible to separate a measurement value by the gravity and a measurement value by the acceleration/deceleration, the inclination level may be measured using only the measurement value by the gravity. However, it is impossible to separate the above two forces from each other.

Accordingly, proposed is a method that can more accurately determine a driving state of a vehicle using an acceleration sensor value and a current speed.

SUMMARY OF THE DISCLOSURE

An aspect of the present disclosure provides a method that can more accurately determine a driving state of a vehicle using both a measurement value of an acceleration sensor and a speed change value of the vehicle by considering that the force applied by acceleration/deceleration barely exists or is insignificant when the speed of the vehicle barely changes in the declining/inclining-slope driving state.

Other purposes and advantages of the present disclosure will be described in the following description and be understood from embodiments of the present disclosure. Also, the purposes and advantages of the present disclosure may be realized by constituent elements disclosed in claims and combinations thereof.

According to an aspect of the present disclosure, there is provided an apparatus for determining a driving state of a moving object, the apparatus including: a gravity value sensor to sense a value of gravity acting on the moving object; a speed measurement unit to measure a speed of the moving object; and a driving state decision unit to determine whether the moving object is in a level driving state or in an inclining/declining-slope driving state, based on the gravity value and the speed.

According to another aspect of the present disclosure, there is provided a method of determining a driving state of a moving object, the method including: reading an output value of an acceleration sensor that senses a value of gravity acting on the moving object; reading a speed of the moving object from a speed measurement unit; and determining whether the moving object is in a level driving state or in an inclining/declining-slope driving state based on the output value and the speed.

According to the present disclosure, there is provided a new method of determining a driving state of a moving object that can determine whether a moving object is in an inclining/declining-slope driving state, etc., using a Y axis measurement value of an acceleration sensor and a speed of the moving object.

Also, according to the present disclosure, there is provided a method of determining a driving state of a moving object that can overcome the disadvantage of the conventional art where it is difficult to accurately measure a driving state of a moving object since a measurement value by the gravity and the force by acceleration/deceleration are reflected in a measurement value of an acceleration sensor, and also can minimize the effect of acceleration values, excluding a value by the gravity, on the moving object in a region where the force by acceleration/deceleration barely affects, to thereby more accurately determine the driving state of the moving object.

DETAILED DESCRIPTION OF EXEMPLARY EMBODIMENTS

Figure 1:
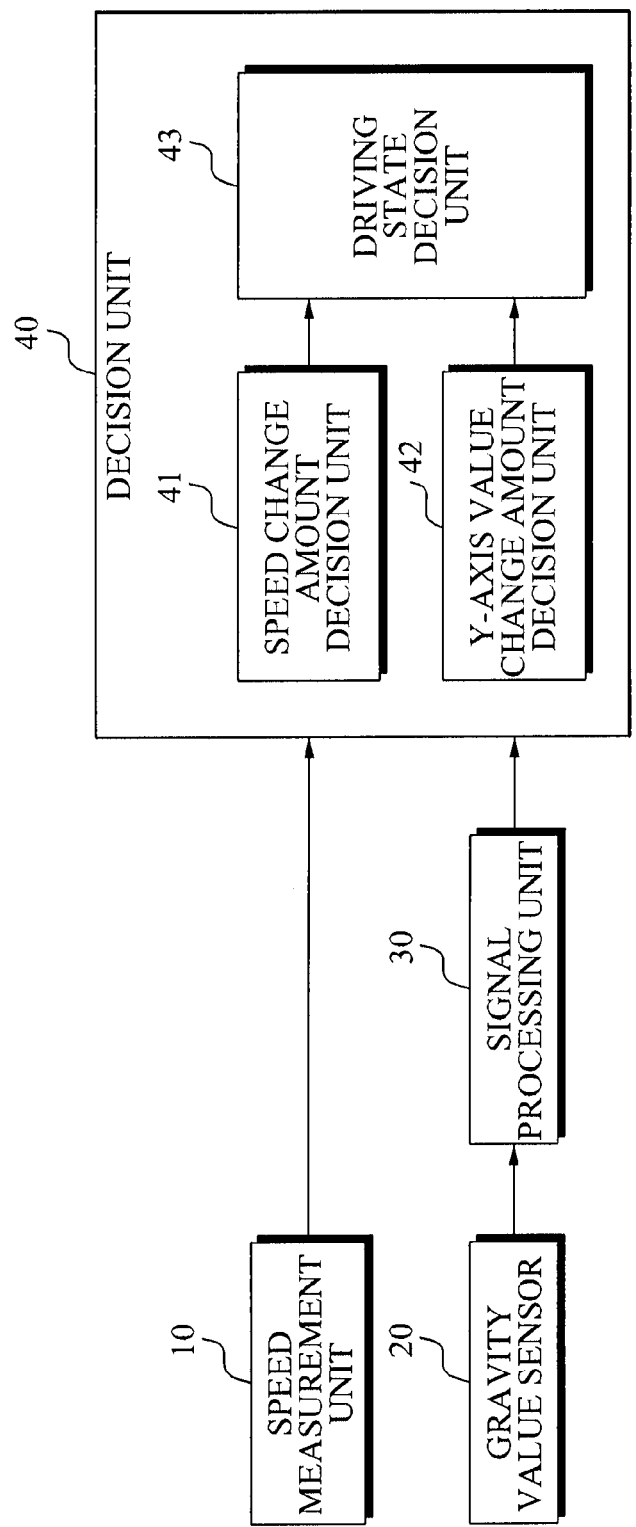
FIG. 1 is a block diagram illustrating an apparatus for determining a driving state of a moving object using a sensor and a speed measurement device according to an embodiment of the present disclosure.

Reference will now be made in detail to embodiments of the present disclosure, examples of which are illustrated in the accompanying drawings, wherein like reference numerals refer to the like elements throughout. The embodiments are described below in order to explain the present disclosure by referring to the figures.

Figure 2:
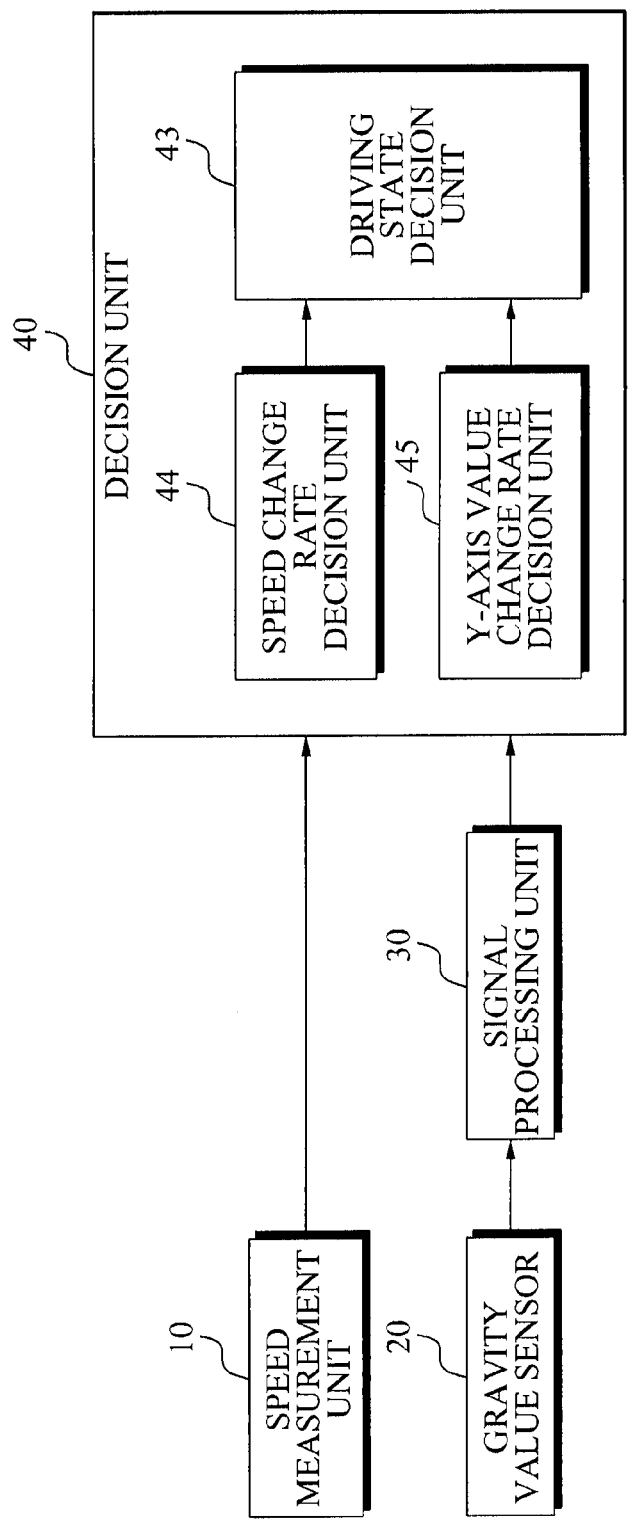
FIG. 2 is a block diagram illustrating an apparatus for determining a driving state of a moving object using a sensor and a speed measurement device according to another embodiment of the present disclosure.

FIG. 1 is a block diagram illustrating an apparatus for determining a driving state of a moving object using a sensor and a speed measurement device according to an embodiment of the present disclosure, and FIG. 2 is a block diagram illustrating an apparatus for determining a driving state of a moving object using a sensor and a speed measurement device according to another embodiment of the present disclosure.

The apparatus for determining the driving state of the moving object will be described in detail with reference to FIG. 1.

The apparatus may include a gravity value sensor 20 to sense a value of gravity acting on the moving object. A device such as a three-axis acceleration sensor installed in the vehicle or embedded in a PND-typed terminal installed in the vehicle may be used for the gravity value sensor 20. The three-axis acceleration sensor may measure acceleration values at X, Y, and Z axes with respect to the moving object. The three-axis acceleration sensor may match the X axis with respect to left/right direction of the moving object, match the Y axis with respect to a travel direction of the moving object, and match the Z axis with respect to an up/down direction of the moving object. In particular, according to an aspect of the present disclosure, a measurement value of the Y axis among X, Y, and Z axes may be used to determine the driving state of the moving object. In this instance, since a measurement value of the acceleration sensor 20 is output in an analog signal, a decision unit may convert the measurement value into a digital signal. For this, a signal processing unit 30 is further included to receive the Y axis measurement value of the acceleration sensor 20, convert the same to the digital signal of an identifiable range, and then transfer the converted Y axis measurement value to the decision unit 40. The signal processing unit 30 may be constructed as an analog-to-digital (A/D) converter.

Also, according to an aspect of the present disclosure, the apparatus may include a speed measurement unit 10 to measure a speed of the moving object. The speed measurement unit 10 may use a speed measured by a Global Positioning System (GPS). The speed measured in the GPS is a speed about one second in the past due to principles of the GPS and thus an output of the currently measured GPS may be identified as the speed of the moving object about one second in the past.

Also, according to an aspect of the present disclosure, the apparatus may include the decision unit 40 to determine whether the moving object is currently in a level driving state or in an inclining/declining-slope driving state using the measured speed and the Y axis measurement value. The decision unit 40 may further include: a speed change amount decision unit 41 to calculate a speed change amount that the measured speed is changed for a predetermined reference time; a Y-axis value change amount decision unit 42 to calculate a Y-axis value change amount that the sensed Y-axis measurement value is changed for a time corresponding to the reference time; and a driving state decision unit 43 to determine whether the moving object is in the level driving state, or in the inclining/declining-slope driving state, based on the speed change amount and the Y-axis value change amount.

The apparatus of FIG. 2 is constructed similar to the apparatus of FIG. 1, but in FIG. 2, the driving state of the moving object is determined based on a speed change rate and a Y axis value change rate, instead of a speed change amount and a Y axis value change amount. In FIG. 2, the decision unit 40 may include a speed change rate decision unit 44 and a Y-axis value change rate decision unit 45.

In order to determine the driving state of the moving object based on the speed change rate and the Y-axis value change rate, when a period of receiving a speed and a Y axis measurement axis changes, a reference value for comparing a change amount of the speed and a change amount of the Y-axis value needs to be changed in FIG. 1. Unlike this, in FIG. 2, although the period changes, the reference value for comparing the change rate may be uniformly maintained and thus the efficiency may be enhanced.

Figure 3:
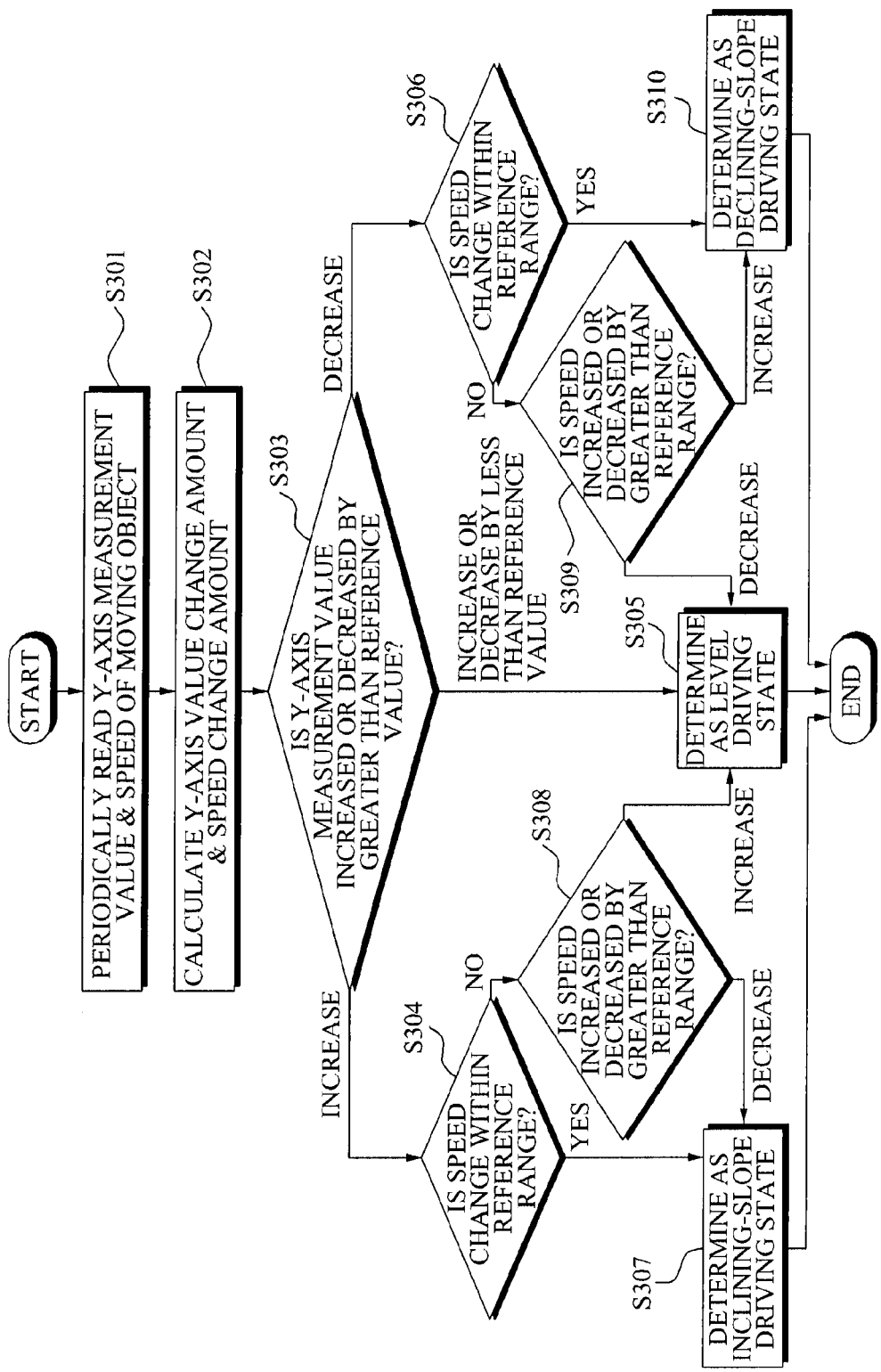
FIG. 3 is a flowchart illustrating a method of determining a driving state of a moving object using a sensor and a speed measurement device according to an embodiment of the present disclosure.

FIG. 3 is a flowchart illustrating a method of determining a driving state of a moving object using a sensor and a speed measurement device according to an embodiment of the present disclosure.

In operation S301, an apparatus for determining the driving state of the moving object may periodically read a Y-axis measurement value from the gravity value sensor 20, that is, the three-axis acceleration sensor, and a speed from the speed measurement unit 10. A change of the speed and the Y-axis measurement value needs to be used in order to measure the driving state of the moving object. Therefore, in operation S302, the apparatus may calculate a Y-axis value change amount that the Y-axis measurement value is changed for a predetermined reference time and a speed change amount that the speed is changed for a time corresponding to the reference time. The change amount of the Y-axis measurement value may be calculated by subtracting the Y-axis measurement value in time t0 from the Y-axis measurement value in time t1 where t1>t0. In this case, when the Y-axis measurement value is increased, the value may be determined as a positive value. Conversely, when the Y-axis measurement value is decreased, the value may be determined as a negative value. The change amount may be calculated in real time. Whether the change amount is increased or decreased by greater than a predetermined reference value is continuously checked.

In operation S303, the apparatus may determine whether the Y-axis measurement value is increased or decreased by greater than the set reference value based on a difference with the reference value. For example, when determining, as an increase or decrease in the Y-axis measurement value, a case where the change amount of the Y-axis measurement value for a unit time (e.g., one hour) is greater than the reference value (e.g., 15), it may be determined whether a value obtained by subtracting the reference value 15 from the Y-axis change amount is greater than 0. In this instance, when the Y-axis change amount calculated in operation S302 is a positive value and the value obtained by subtracting the reference value 15 from the Y-axis change amount is greater than 0, it may be determined the Y-axis measurement value is increased by greater than the reference value. Conversely, when the Y-axis change amount is a negative value and the value obtained by subtracting the reference value 15 from the absolute value of the Y-axis change amount is greater than 0, it may be determined the Y-axis measured value is decreased by greater than the reference value. If the Y-axis change amount is within 15, it may be determined the output value of the Y-axis is barely changed. Thus, the decision unit 40 may determine the moving object is in the level driving state in operation S305.

When it is determined the Y-axis measurement value is increased in operation S303, the driving state may be changed depending on a speed change. Thus, in operation S304, it may be checked whether the speed change is within a reference range. When the speed change is within the reference range, it corresponds to a case where the Y-axis measurement value is increased but the speed is barely changed. Thus, it may be determined the driving state of the moving object is in the inclining-slope driving state in operation S307. Conversely, when the speed change is outside the reference range, it may be determined whether the speed is increased or decreased by greater than the reference range in operation S308. In this instance, when the speed is increased by greater than the reference range, it corresponds to a case where both the Y-axis measurement value and the speed are increased. Thus, it may be determined the driving state of the moving object is in the level driving state in operation S305. Conversely, when the speed is decreased by greater than the reference range, it corresponds to a case where the Y-axis measurement value is increased but the speed is decreased. Thus, it may be determined the moving object is in the inclining-slope driving state in operation S307. In this instance, like operation S303, when determining whether the speed is increased or decreased by greater than the reference range, it may be determined whether a value obtained by subtracting the reference range from the speed change is greater than 0. When the value is greater than 0, it may be determined the speed is increased or decreased by greater than the reference value. As described above in operation S303, the speed change may be a negative value. Thus, in the case of decrease, whether the value obtained by subtracting the reference value from the absolute value of the speed change is greater than 0 may be determined.

Also, when it is determined the Y-axis measurement value is decreased in operation S303, it may be checked whether the speed is within the reference range in operation S306. When the speed change is within the reference range, it corresponds to a case where the Y-axis measurement value is decreased but the speed is barely changed. Therefore, it may be determined the moving object is in the declining-slope driving state in operation S310. Conversely, when the speed change is outside the reference range, it may be determined whether the speed is increased or decreased by greater than the reference range in operation S309. In this instance, when the speed is decreased by greater than the reference range, it may correspond to a case where both the Y-axis measurement value and the speed are decreased. Thus, it may be determined the moving object is in the level driving state in operation S305. Conversely, when the speed is increased by greater than the reference range, it corresponds to a case where the Y-axis measurement value is decreased but the speed is increased. Thus, it may be determine the moving object is in the declining-slope driving state in operation S310.

The embodiments above-described with respect to FIGS. 1 to 3 correspond to an example of an apparatus for determining a driving state of a moving object using an acceleration sensor and a speed measurement unit. The apparatus is provided for better comprehension and ease of description and thus the present disclosure is not limited thereto. Specifically, it will be apparent to those skilled in the art that various modifications and changes may be made from the description.

Figure 4:
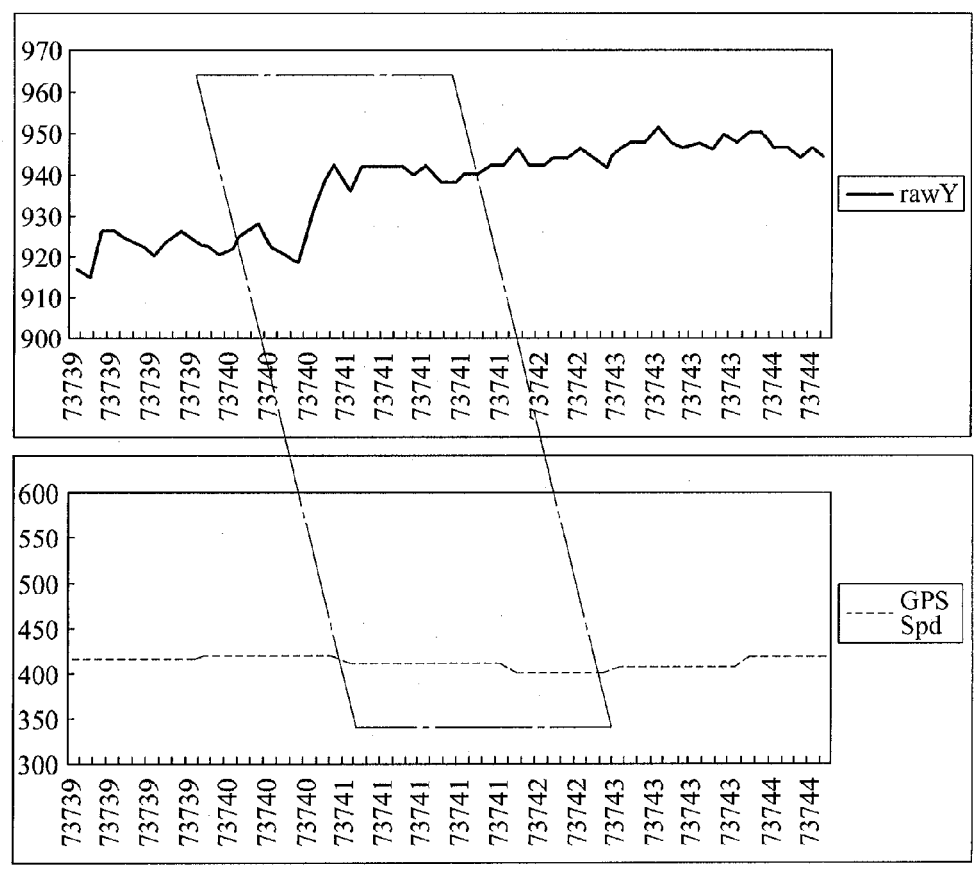
FIG. 4 is a graph illustrating a speed change of a moving object over time and a Y axis measurement value change of a sensor over time according to an embodiment of the present disclosure.

FIG. 4 is a graph illustrating a change of a Y-axis measurement value over time and a change of a GPS speed over time over time in an actual inclining-scope driving state according to an embodiment of the present disclosure.

Hereinafter, a method of determining a driving state of a moving object will be described in detail with reference to FIG. 4. Herein, it is assumed that when a change amount measured for a reference time 1 is greater than a reference value 15, it is determined a Y-axis measurement value is increased or decreased. The above values may be changed to appropriate values.

In FIG. 4, in a dotted square section is from time 73740 to 73741 in association with the Y-axis measurement value, and the change amount that the Y-axis measurement value is changed for one hour is 18. Specifically, the change amount 18 is greater than the reference value 15 and thus it is determined the Y-axis measurement value is increased by greater than the reference value. In this instance, a speed change amount needs to be determined. Due to characteristics of a GPS, a speed about one second in the past is detected as a current output value. Thus, a section from time 73741 to time 73742 is a time corresponding to a time where the Y-axis change amount is calculated. Thus, the speed change of the GPS is −30 and the absolute value thereof is within a reference range (e.g., 70). It corresponds to a case where the Y-axis measurement value is increased but the speed is barely changed. Thus, it may be determined the moving object is in the inclining-slope driving state.

Figure 5:
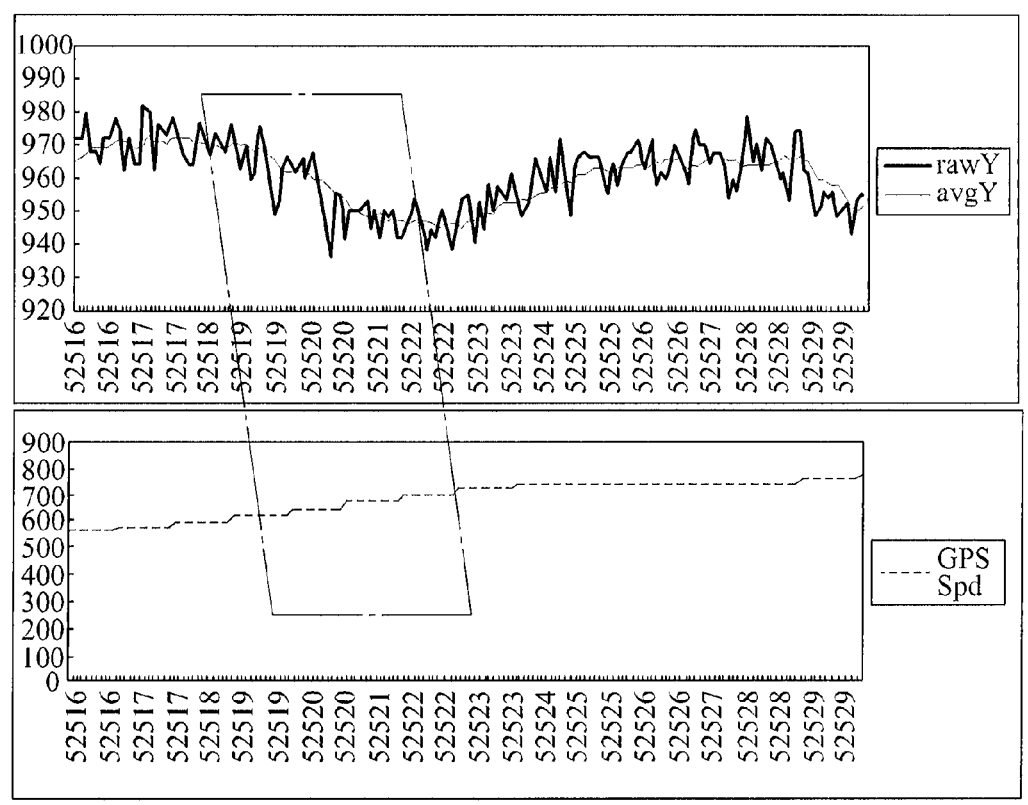
FIG. 5 is a graph illustrating a speed change of a moving object over time and a Y axis measurement value change of a sensor over time and the average change thereof according to an embodiment of the present disclosure.

In FIG. 5, rawY denotes a Y-axis measurement value and avgY denotes the average of ten Y values. −25 was the change amount of the Y-axis measurement value measured for a period of time from time 52519 to time 52522. The absolute value thereof is 25 which is greater than the reference value 15. Therefore, it is determined the Y-axis measurement value is decreased by greater than the reference value. Thus, the speed change amount is measured, as 80, for a time corresponding to the above period of time, which is greater than the reference range (e.g., 70). It corresponds to a case where the Y-axis measurement value is decreased and the speed of the moving object is increased by greater than the reference range. Thus, it may be determined the moving object is in the declining-slope driving state.

According to the above-described method, it is possible to more accurately determine whether the moving object is in the level driving state, or in the inclining/declining-slope driving state.

The exemplary embodiments of the present disclosure include computer-readable media including program instructions to implement various operations embodied by a computer. The media may also include, alone or in combination with the program instructions, data files, data structures, tables, and the like. The media and program instructions may be those specially designed and constructed for the purposes of the present disclosure, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although a few embodiments of the present disclosure have been shown and described, the present disclosure is not limited to the described embodiments. Instead, it would be appreciated by those skilled in the art that changes may be made to these embodiments without departing from the principles and spirit of the present disclosure, the scope of which is defined by the claims and their equivalents.

The invention claimed is:

1. A navigation system for determining a driving state of a moving object, the navigation system comprising:
a gravity value sensor to sense a value of gravity acting on the moving object;
wherein the gravity value sensor comprises an acceleration sensor, and the acceleration sensor periodically senses a Y-axis measurement value that is obtained by matching a sensor axis of the acceleration sensor with a travel direction of the moving object;
a speed measurement unit to measure a speed of the moving object; and
a driving state decision unit to determine whether the moving object is in a level driving state or in an inclining/declining-slope driving state, based on the gravity value;
wherein the driving state decision unit comprises:
a speed change amount or rate decision unit to calculate a speed change amount or rate that the measured speed is changed for a predetermined reference time;
a Y-axis value change amount or rate decision unit to calculate a Y-axis value change amount or rate that the sensed Y-axis measurement value is changed for a time corresponding to the predetermined reference time; and
a driving state decision unit to determine whether the moving object is in the level driving state, or in the inclining/declining-slope driving state, based on the speed change amount or rate and the Y-axis value change amount;
wherein when an increase of the Y-axis measurement value is greater than a predetermined reference value and the speed change amount is within a reference range, the driving state decision unit determines that the moving object is in the inclining-slope driving state;
wherein when a decrease of the Y-axis measurement value is greater than the predetermined reference value and the speed change amount is within the reference range, the driving state decision unit determines that the moving object is in the declining-slope driving state;
wherein when the increase of the Y-axis measurement value is greater than the predetermined reference value and the speed change is a decrease and the speed change amount is outside the reference range, the driving state decision unit determines that the moving object is in the inclining-slope driving state; and
wherein when the decrease of the Y-axis measurement value is greater than the predetermined reference value and the speed change is an increase and the speed change amount is outside the reference range, the driving state decision unit determines that the moving object is in the declining-slope driving state.

2. The navigation system of claim 1, wherein, when the Y-axis value change rate is a positive value and is greater than a predetermined reference value, and when the speed change rate is within a reference range, the driving state decision unit determines the moving object is in the inclining-slope driving state.

3. The navigation system of claim 1, wherein, when the Y-axis value change rate is a negative value and an absolute value thereof is greater than a predetermined reference value, and when the speed change rate is within a reference range, the driving state decision unit determines the moving object is in the declining-slope driving state.

4. The navigation system of claim 1, wherein:
when the Y-axis value change rate is a positive value and is greater than a predetermined reference value, and when the speed change rate decreases beyond a reference range, the driving state decision unit determines the moving object is in the inclining-slope driving state, and
when the Y-axis value change rate is a negative value and an absolute value thereof is greater than the predetermined reference value, and when the speed change rate increases beyond the reference range, the driving state decision unit determines the moving object is in the declining-slope driving state.

5. The navigation system of claim 1, further comprising:
a signal processing unit including an analog-to-digital (A/D) converter to convert an output signal of the gravity value sensor to a digital signal belonging to an identifiable range of the driving state decision unit.

6. The navigation system of claim 1, wherein the speed measurement unit comprises a Global Positioning System (GPS).

7. A method of determining by a navigation system a driving state of a moving object, the method comprising:
reading an output value of an acceleration sensor that senses a value of gravity acting on the moving object;
wherein the reading of the output value periodically reads an output value of Y-axis corresponding to an acceleration sensor axis matching a travel direction of the moving object;
reading a speed of the moving object from a speed measurement unit; and
determining by the navigation system whether the moving object is in a level driving state or in an inclining/declining-slope driving state based on a Y-axis value change amount of the output value and a speed change amount or rate that the measured speed is changed for a predetermined reference time;
wherein the determining by the navigation system comprises: calculating the Y-axis value change amount for a predetermined reference time by subtracting a Y-axis measurement value taken at time t0 from a Y-axis measurement value taken at time t1 corresponding to the predetermined reference time, and calculating the speed change amount for a time corresponding to the predetermined reference time;
wherein when an increase of the Y-axis measurement value is greater than a predetermined reference value and the speed change amount is within a reference range, the determining determines that the moving object is in the inclining-slope driving state;
wherein when a decrease of the Y-axis measurement value is greater than the predetermined reference value and the speed change amount is within the reference range, the determining determines that the moving object is in the declining-slope driving state;
wherein when the increase of the Y-axis measurement value is greater than the predetermined reference value and the speed change is a decrease and the speed change amount is outside the reference range, the determining determines that the moving object is in the inclining-slope driving state; and wherein when the decrease of the Y-axis measurement value is greater than the predetermined reference value and the speed change is an increase and the speed change amount is outside the reference range, the determining determines that the moving object is in the declining-slope driving state.

8. At least one non-transitory computer-readable storage medium storing a computer program of instructions configured to be readable by at least one processor for instructing the at least one processor to execute a computer process for performing the method according to claim 7.

* * * * *